United States Patent
Lee et al.

(10) Patent No.: US 7,412,251 B2
(45) Date of Patent: Aug. 12, 2008

(54) WIRELESS COMMUNICATION APPARATUS, WIRELESS COMMUNICATION SYSTEM ADOPTING THE SAME AND COMMUNICATION METHOD THEREOF

(75) Inventors: Tae-jin Lee, Anyang (KR); Kyung-hun Jang, Suwon (KR); Hyun-sook Kang, Yongin (KR); Jong-hun Park, Kwacheon (KR)

(73) Assignee: Samsung Electronics Co., Ltd., Suwon (KR)

( * ) Notice: Subject to any disclaimer, the term of this patent is extended or adjusted under 35 U.S.C. 154(b) by 568 days.

(21) Appl. No.: 09/915,554

(22) Filed: Jul. 27, 2001

(65) Prior Publication Data

US 2002/0090968 A1    Jul. 11, 2002

(30) Foreign Application Priority Data

Jan. 5, 2001    (KR) ................................ 2001-580

(51) Int. Cl.
*H04B 7/00*    (2006.01)
*H04Q 7/20*    (2006.01)

(52) U.S. Cl. .............. 455/520; 455/3.01; 455/512; 455/517; 370/343; 370/449

(58) Field of Classification Search ........... 455/343.3, 455/512, 450, 517–521, 502, 67.7, 41.2, 455/67.11, 445, 3.03, 41.1, 42, 509, 516, 455/515, 434, 11.1, 452.1, 3.01, 510; 370/311, 370/312, 329, 528, 449, 346, 343, 344
See application file for complete search history.

(56) References Cited

U.S. PATENT DOCUMENTS 4,763,323 A    8/1988    Nelson et al.
5,583,866 A * 12/1996    Vook et al. .................. 370/312
5,844,900 A * 12/1998    Hong et al. ................. 370/342

(Continued)

FOREIGN PATENT DOCUMENTS

EP    0 221 708 A2    5/1987

(Continued)

OTHER PUBLICATIONS

Kalia M. et al.: "Data Scheduling and SAR Bluetooth Mac" VTC 2000-Spring. 2000 IEEE 51st. Vehicular Technology Conference Proceedings. Tokyo, Japan, May 15-18, 2000 IEEE Vehicular Technology Conference New York, NY: IEEE, US, vol. 2 of 3 Conf. 51, May 15, 2000, pp. 716-720.

(Continued)

*Primary Examiner*—John Lee
(74) *Attorney, Agent, or Firm*—Sughrue Mion, PLLC (57) ABSTRACT

A wireless communication apparatus, a wireless communication system adopting the same and a communication method thereof are provided. In the wireless communication system, a slave device transmits a predetermined priority to the master device, and a master device receives the predetermined priority from the slave device, and determines and assigns the slave device with a priority considering the predetermined priority. According to the wireless communication apparatus, the wireless communication system adopting the same and the communication method thereof, a suitable transmission rate is assigned to the slave device, not uniformly, but according to the need of the slave device, so that assigning of an excessive or insufficient transmission rate can be prevented.

24 Claims, 9 Drawing Sheets

U.S. PATENT DOCUMENTS

| | | | |
|---|---|---|---|
| 6,192,230 B1 * | 2/2001 | van Bokhorst et al. | 455/343.3 |
| 6,359,901 B1 * | 3/2002 | Todd et al. | 370/465 |
| 6,411,815 B1 * | 6/2002 | Balasuriya | 455/512 |
| 6,636,738 B1 * | 10/2003 | Hayashi | 455/450 |
| 6,683,886 B1 * | 1/2004 | van der Tuijn et al. | 370/458 |
| 6,940,831 B1 * | 9/2005 | Omi et al. | 370/310.1 |
| 2002/0089963 A1 * | 7/2002 | Kang et al. | 370/340 |

FOREIGN PATENT DOCUMENTS

| | | |
|---|---|---|
| EP | 0 372 567 A2 | 6/1990 |
| JP | 60-028349 | 2/1985 |
| JP | 11-068808 | 3/1999 |
| JP | 11-266255 | 9/1999 |
| WO | WO 99 00941 A | 1/1999 |

OTHER PUBLICATIONS

Kalia M. et al.: "MAC Scheduling and SAR policies for Bluetooth: a master driven TDD pico-cellular wireless system" Mobile Multimedia Communications, 1999. (MOMUC '99). 1999 IEEE International Workshop on San Diego, CA, USA, Nov. 15-17, 1999, Piscataway, NJ, USA, IEEE, US, Nov. 15, 1999, pp. 384-388.

* cited by examiner

| SLAVE | ASSIGNED PRIORITY | POLLING FREQUENCY | | | |
|---|---|---|---|---|---|
| | | (t=0) | T1 | T2 | T3 |
| SLAVE 1 | HIGH | 3 | 3→2 | 2→1 | 1→0 |
| SLAVE 2 | MEDIUM | 2 | 2→1 | 1→0 | . |
| SLAVE 3 | LOW | 1 | 1→0 | . | . |
| COUNT (NUMBER OF SLAVES) | | 3 | 2 | 1 | 0 |

FIG.8A

```
MAIN:
num = 0
count = 0
while (num >= 0)
    if (new_conn ==1)                                          /* if a new connection comes */
        num = num + 1
        DECIDE PRIORITY:
        if (new_conn_prio_request == low)                      /* if new conn's request == low priority */
            P(num) = 1                                         /* assign low priority as requested */
        else if (new_conn_prio_request == medium)              /* new conn's request == medium priority */
            if (num_of_med_prio <= 1)                          /* if number of medium priority conn <= 1 */
                P(num) = 2                                     /* assign medium priority as requested */
            else                                               /* otherwise, */
                P(num) = 1                                     /* assign low priority */
            end
        else
            if (num_of_high_prio == 0)                         /* if new conn's request == high priority */
                P(num) = 3                                     /* if number of high priority conn == 0 */
            else if (num_of_med_prio <= 1)                     /* assign high priority as requested */
                P(num) = 2                                     /* if number of medium priority conn <= 1 */
            else                                               /* assign medium priority instead */
                P(num) = 1                                     /* otherwise, */
            end                                                /* assign low priority */
        end
    end if (current_conn_exit == 1)                                /* if an existing connection exits */
        num = num - 1
    end
```

FIG.8B

```
POLLING:
  if (count == 0)
    for j=1:num
      p(j) = P(j)
    end
  end count = num
  for j=1:num
    if (p(j)>0)
      POLL CONNECTION i
      p(j) = p(j) - 1
    else
      count = count - 1
    end
  end
end /* while */
```

WIRELESS COMMUNICATION APPARATUS, WIRELESS COMMUNICATION SYSTEM ADOPTING THE SAME AND COMMUNICATION METHOD THEREOF

BACKGROUND OF THE INVENTION

1. Field of the Invention

The present invention relates to a wireless communication apparatus, a wireless communication system adopting the same and a communication method thereof, and more particularly, to a wireless communication apparatus for variably allocating the transmission rate to slave devices according to service features of the slave devices, a wireless communication system adopting the same and a communication method thereof. The present application is based on Korean Patent Application No. 2001-580, which is incorporated herein by reference.

2. Description of the Related Art

Bluetooth is a communication technology that allows transmission of information such as audio or video data with the velocity of up to 1 Mbps at a distance of 10 to 100 m.

A Bluetooth apparatus performs a mutual communication according to a Bluetooth communication, and constructs a link state in which communication is enabled through operations such as inquiry, inquiry scan, page, page scan, etc. During these processes, it is determined which device is a master device and which devices are slave devices. At least one slave device is linked to one master device to form a network called a Piconet.

The master and slave devices perform a bi-directional communication via TDD (Time Division Duplex).

According to a current Bluetooth communication, one master device in the Piconet can link seven slave devices in the active state to perform mutual communication.

The master device polls the slave device in an even-numbered slot, while the slave devices polled by the master device transmit data to the master in an odd-numbered slot. If the slaves are not polled by the master device, the slaves cannot transmit data.

In the current Bluetooth communication, a round robin polling method is mainly used, which allows equal data transmission opportunity to each of the slave devices.

The master device sends a packet to the slave device in an even-numbered slot (0, 2, 4, . . . ) for polling. Here, the polling packet occupies one (1), three (3) or five (5) of the even-numbered slots (0, 2, 4,. . . ). The polling packet is transmitted to allow data communication according to the order set for the slaves that maintain the link to the master device.

The slave devices polled by the master device send a packet to the master device in an odd-numbered slot (1, 3, 5, . . . ). The packets occupy one (1), three (3) or five (5) of the odd-numbered slots.

Since the current Bluetooth communication uses the round robin polling method, the master device respectively polls all the slaves in the Piconet one by one.

Figure 1:
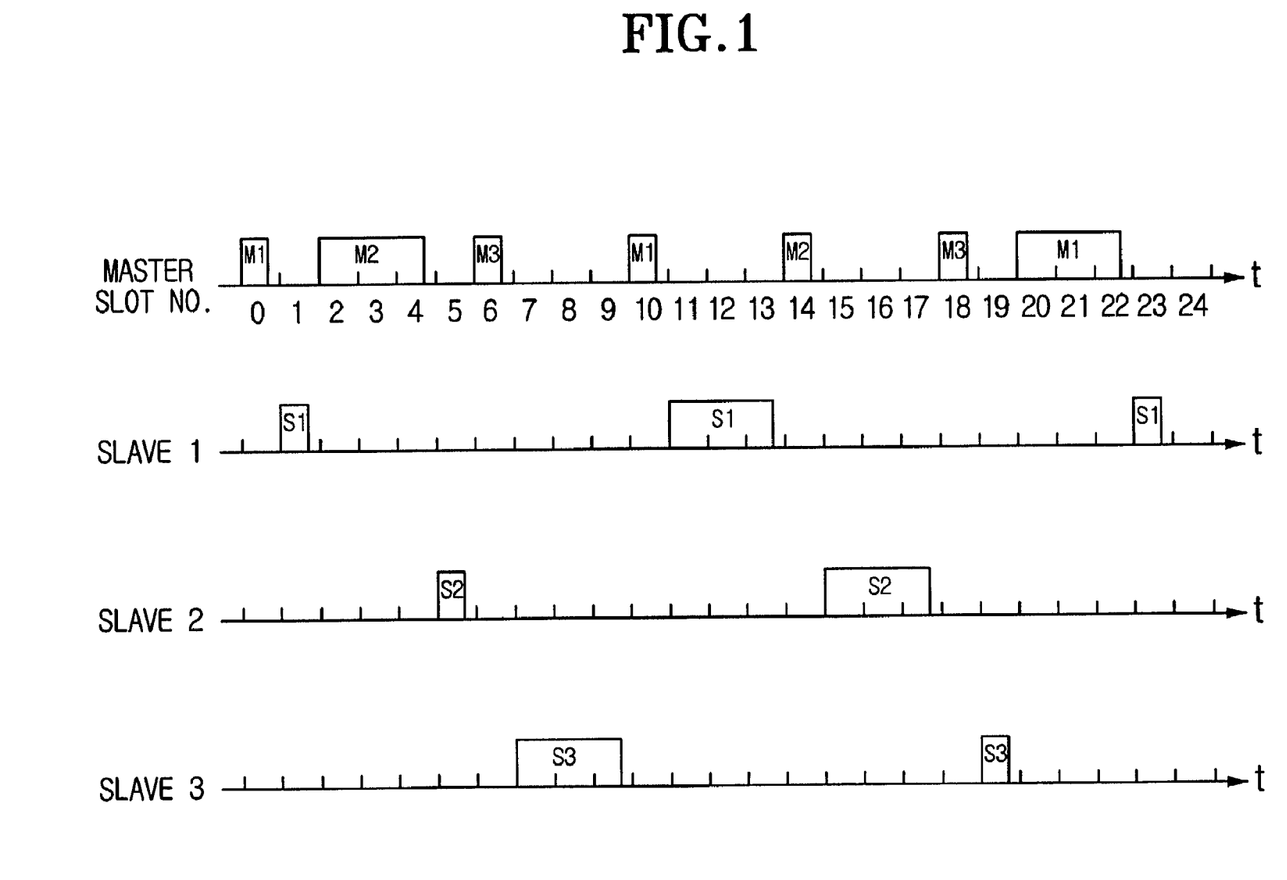
FIG. 1 shows timings of operations of master and slave devices in a general Bluetooth communication system.

FIG. 1 shows timings of operations of master and slave devices in a general Bluetooth communication system.

As shown in FIG. 1, the master device first polls a slave device 1 in an M1 transmission slot. The slave device 1 in an active mode confirms that the data transmitted from the master device is addressed to the slave device 1, and transmits the data to the master device in an S1 transmission slot that is assigned after a master transmission section.

Likewise, the master device sequentially polls the slave devices 2 and at a certain slot interval.

Then, the slave devices 2 and 3 sequentially transmit data to the master device at a certain slot interval according to the order of polling of the master device in S2 and S3 transmission slot sections.

According to the above-described polling of the master device, the frequency of the polling to each of the slave devices by the master device is balanced so that the transmission rate can be assigned to all of the slave devices uniformly.

However, considering the fact that the volume of transmitted data varies depending on the type of service being provided, the transmission efficiency cannot be guaranteed by the current Bluetooth communication, since all the slave devices are assigned with the uniform transmission rate regardless of service type. In other words, the assigned transmission rate is less than or greater than the service requires for data transmission.

SUMMARY OF THE INVENTION

The present invention is proposed to improve the foregoing problems and it is therefore an object of the invention to provide a wireless communication apparatus which can variably assign a slave device with suitable transmission rate according to the volume of data to be transmitted by the slave device, a wireless communication system adopting the same, and a communication method thereof.

According to an embodiment of the invention to obtain the foregoing object, a wireless communication apparatus for performing a wireless communication is provided, the apparatus comprising: a transceiving unit for receiving externally transmitted data, sending a signal that is subject to transmission, maintaining a link to at least one slave device while receiving a priority from the at least one slave device when being operated as a master device; and a controller for determining the priority of the at least one slave device considering the received priority, and determining the frequency of communication according to the determined priority of the at least one slave device and controlling the communication with the at least one slave device.

Preferably, the controller allocates a priority lower than the received priority when the priority received from a slave device cannot be allocated to the slave device.

Also, the controller communicates with the slave device as determined by the frequency of communication, based upon the allocated priority.

Further, the controller subtracts one from the frequency of communication for every one communication.

According to another embodiment of the invention to obtain the foregoing object, a wireless communication system having at least one slave device and a master device linked with the at least one slave device is provided, wherein the at least one slave device transmits a predetermined priority to the master device; and wherein the master device receives the priority from the at least one slave device, and determines and allocates the priority for the at least one slave device considering the received priority.

According to another embodiment of the invention to obtain the foregoing object, a communication method in a wireless communication system having at least one slave device and a master device linked with the at least one slave device is provided, comprising the steps of: receiving a previously determined priority from the at least one slave device; and determining and allocating a priority for the at least one slave device considering the received priority.

BRIEF DESCRIPTION OF THE DRAWINGS

The above object and other features of the present invention will be clarified by the following description of the preferred embodiments thereof with reference to the attached drawings, in which.

DETAILED DESCRIPTION OF THE PREFERRED EMBODIMENT

Hereinafter, a wireless communication apparatus, a wireless communication system adopting the same and a communication method thereof according to a preferred embodiment of the present invention will be described in greater detail with reference to the appended drawings.

The description will be made with respect to the wireless communication apparatus applied to a Bluetooth communication.

The wireless communication apparatus that communicates according to a Bluetooth communication is operated either as a master or a slave device. Therefore, the wireless communication apparatus will be called a 'master device' when operated as a master, and a 'slave device' when operated as a slave.

Figure 2:
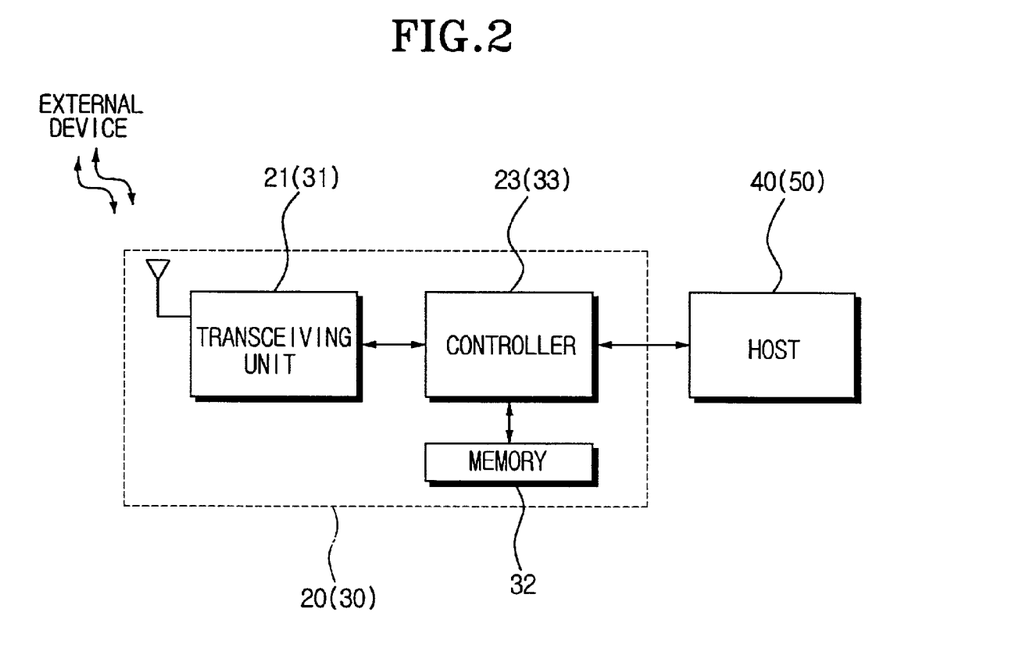
FIG. 2 is a block diagram for illustrating a wireless communication apparatus according to the invention.

FIG. 2 is a block diagram for illustrating a wireless communication apparatus according to an embodiment of the invention.

Referring to FIG. 2, the wireless communication apparatus 20 or 30 comprises a transceiving unit 21 or 31, a memory 32 and a controller 23 or 33. The reference numerals redundantly designated to the same elements, i.e., those of 20, 21, 23 and 40 are the wireless communication apparatus operated as a slave device and its components, while 30, 31, 32, 33 and 50 are the wireless communication apparatus operated as a master device and its components.

First, the wireless communication apparatus 20 that is operated as a slave device will be described.

The transceiving unit 21 processes an externally received signal, an RF signal for example, and also sends a packet externally.

The controller 23 is linked to a host 40 via a communication interface. Here, a communication terminal such as a laptop computer, mobile telephone, printer, etc. can serve as the host.

The controller 23 processes a signal requested from the host 40 and processes a signal received through the transceiving unit 21.

When the wireless communication apparatus 20 forms a wireless network with other wireless communication apparatuses, the controller 23 requests a suitable priority corresponding to the data rate that the controller 23 is required to transmit.

The priority is decided according to a polling frequency by the master device. Also, the device having a higher priority is polled more often. In this embodiment, the levels of priority include high, medium, and low levels.

Figure 3:
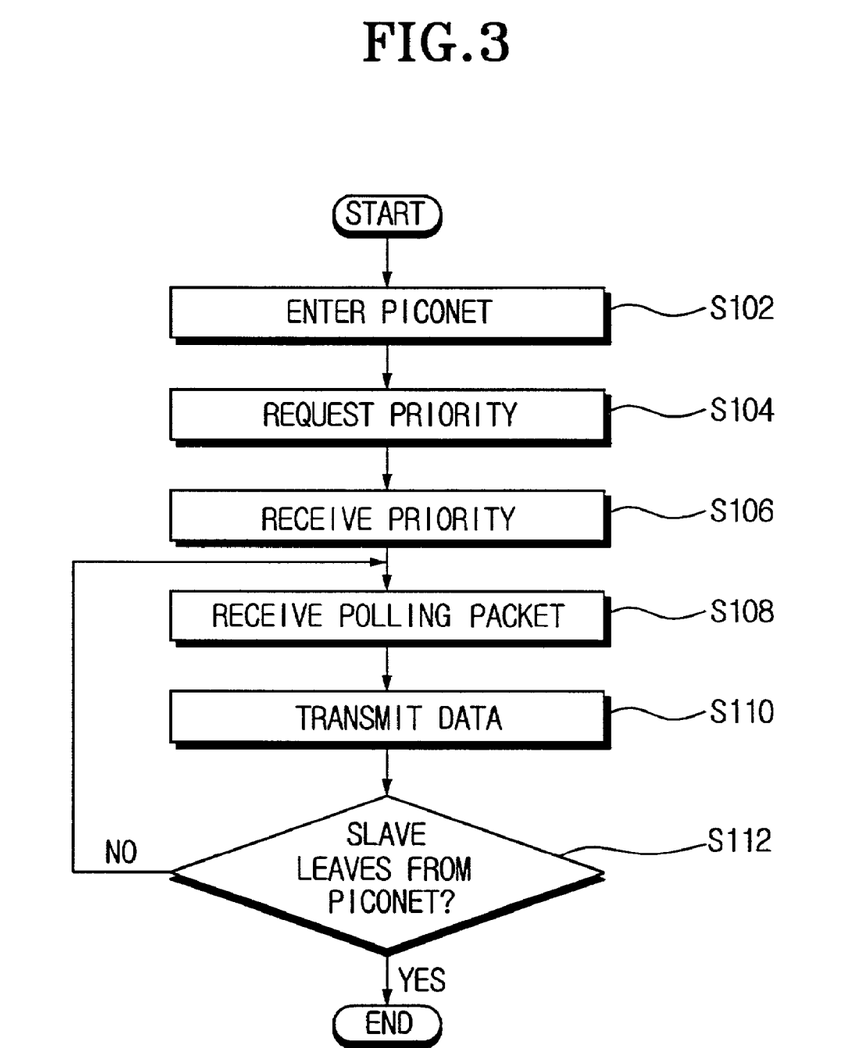
FIG. 3 is a flow chart for illustrating a communication process when the wireless communication apparatus in FIG. 2 is operated as a slave device.

FIG. 3 shows a communicating process of the wireless communication apparatus 20 operated as a slave device.

Referring to FIG. 3, upon participating in a new Piconet (step S102), the slave device requests the master to assign a suitable priority (step S 104).

The slave device requests a suitable priority according to the type of the service to be transmitted to the master device. Accordingly, the high priority is requested for a service type that transmits a large amount of data, while the low priority is requested for a service that transmits a small amount of data.

The slave device receives a priority determined by the master device (step S106). A process of determining the priority of the slave device will be described in greater detail later when describing the wireless communication apparatus that is operated as a master.

The slave device receives the polling packet from the master device (step 108), and also transmits data as a packet externally (step S110). The slave device repeats S 108 and S 110 until the slave device exits the Piconet.

If the slave device exits the Piconet (step S112), the communicating process is terminated.

Next, the wireless communication apparatus 30 operated as a master will be described.

The transceiving unit 31 processes an externally received signal, an RF signal for example, and also sends a packet externally.

The memory 32 stores priorities of the slave devices that are currently linked to the Piconet. Further, the memory 32 stores a maximum number of slave devices of the high priority and medium priority, respectively (hereinafter called 'high priority maximum number' and 'medium priority maximum number', respectively).

Also, the memory 32 stores a number of the slave devices to be polled, and the priority and the polling frequency that are assigned to each of the slave devices.

When the polling frequency of each slave device becomes zero, both the polling frequency and the number of slave devices to be polled are updated to the initial value that is set prior to the polling.

The controller 33 is linked to a host 50 through a communication interface. Here, any proper communication terminal such as a laptop computer, mobile telephone, printer, etc. can serve as the host 50.

The controller 33 processes a signal requested from the host 50, and also processes a signal received through the transceiving unit 31.

Also, the controller 33 maintains the linked state with at least one slave, and at the same time, increases or decreases the total number of the slave devices whenever a slave device enters or exits the Piconet.

The controller 33 determines the priority of the services requested by a slave device according to the priorities of the other slave devices, and determines the order and the polling frequency, and controls the polling according to the determined priority of each slave device.

Figure 4:
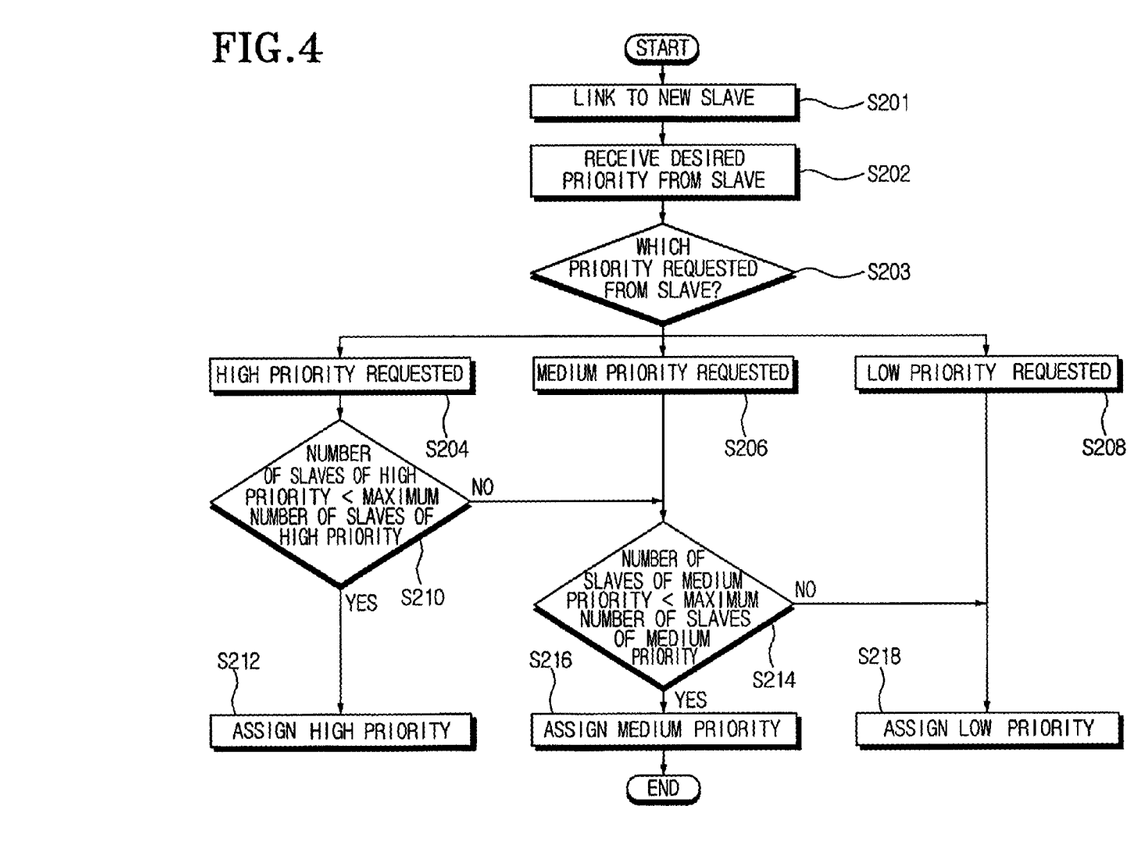
FIG. 4 is a flow chart for illustrating a process of determining priority when the wireless communication apparatus in FIG. 2 is operated as a master device.

FIG. 4 shows the operation of the wireless communication apparatus 30 as a master that determines the priority of the slave device.

When a new slave device enters and is linked in the Piconet (step S201), the master device receives a desired priority from the new slave device (step S202).

The master device determines the level of the priority that is requested by the new slave device (step S203).

When the high priority is requested by the new slave device (step S204), the master device determines whether the current number of the slave devices of high priority in the Piconet is smaller than the predetermined maximum number of the slave devices that could have high priority in the Piconet, i.e., the high priority maximum number (step S210).

If the current number of the slave devices of high priority is smaller than the high priority maximum number, the master device assigns the high priority to the new slave device (step S212).

If the current number of slave devices of high priority is greater than or equal to the high priority maximum number, the master device determines whether the current number of slave devices of medium priority is smaller than the predetermined medium priority maximum number (step S214). This determining step (S214) will be described later.

Meanwhile, if the medium priority is requested by the new slave device (step S206), the master device determines if the current number of slave devices of medium priority is smaller than the predetermined maximum number of slave devices that could have the medium priority in the Piconet, i.e., the medium priority maximum number (step S214).

If the number of slave devices having the medium priority is smaller than the predetermined medium priority maximum number, the master device assigns the medium priority to the new slave device (step S216).

However, if the number of slave devices having medium priority is greater than or equal to the medium priority maximum number, the master device assigns the low priority to the new slave device (step S218).

When the low priority is requested by the slave device (step S208), the master device assigns the low priority to the new slave device (step S218).

As described above, the master device performs a process of determining priority of the respective slave devices instead of simply accepting the priority request from the slave devices. This is to prevent an excessive number of slave devices from having high and medium priorities in the Piconet.

Figure 5:
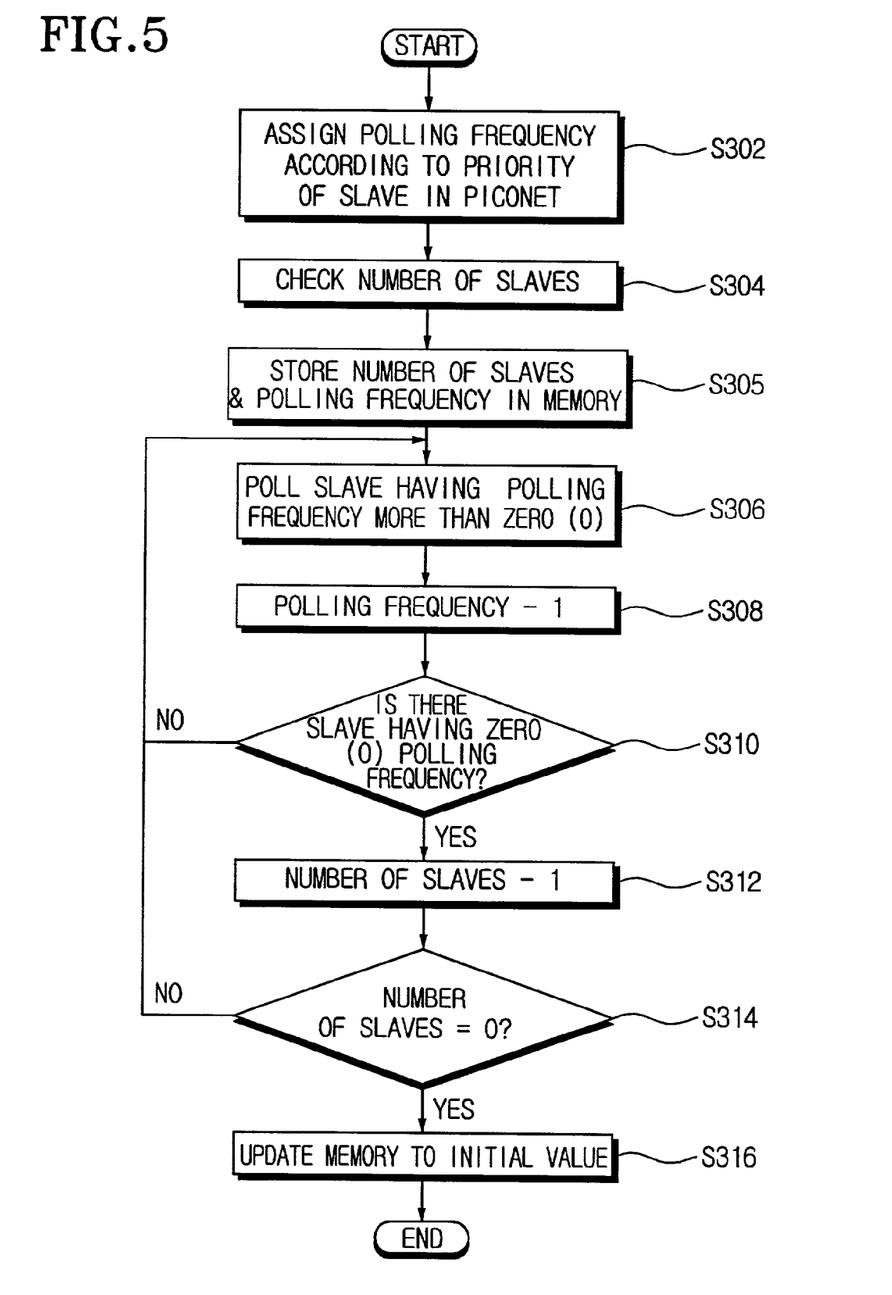
FIG. 5 is a flow chart for illustrating a polling process when the wireless communication apparatus in FIG. 2 is operated as a master device.

Next, the polling operation of the wireless communication apparatus 30 as a master device according to the priorities assigned to the respective slave devices in the Piconet will be described.

FIG. 5 illustrates a polling process of the wireless communication apparatus 30 that is operated as a master device.

The master device assigns the respective slave devices in the Piconet with the polling frequency corresponding to the predetermined priority of the respective slave devices (step S302), and checks the total number of slave devices (step S304). The total number of slave devices and the polling frequency of the slave devices are stored in the memory 32 (step S305).

Among the slave devices in the Piconet, the slave devices that have a polling frequency greater than zero are sequentially polled according to the priorities thereof (step S306).

When the slave device is polled once, one (1) time is subtracted from the polling frequency which is set for the slave device (step S308). For example, the slave device assigned with one (1) time polling in S302 will have zero (0) time polling as one (1) time is subtracted from the assigned polling frequency.

The master device determines whether there is a slave device having the zero (0) time polling frequency (step S310), and repeatedly polls the slave device until the polling frequency of the slave device becomes zero (0).

If there is a slave device having the zero (0) time polling frequency after S308, one (1) is subtracted from the total number of the slave devices (step S312), and the master device returns to the step of polling the slave devices and repeats the steps from S306 to S312 until the total number of the slave device becomes zero (0).

If the total number of the slave devices becomes zero (0) (step S314), the memory 32 is updated to have the initial value of both the total number and the polling frequency of the slave devices (step S316).

Figure 6:
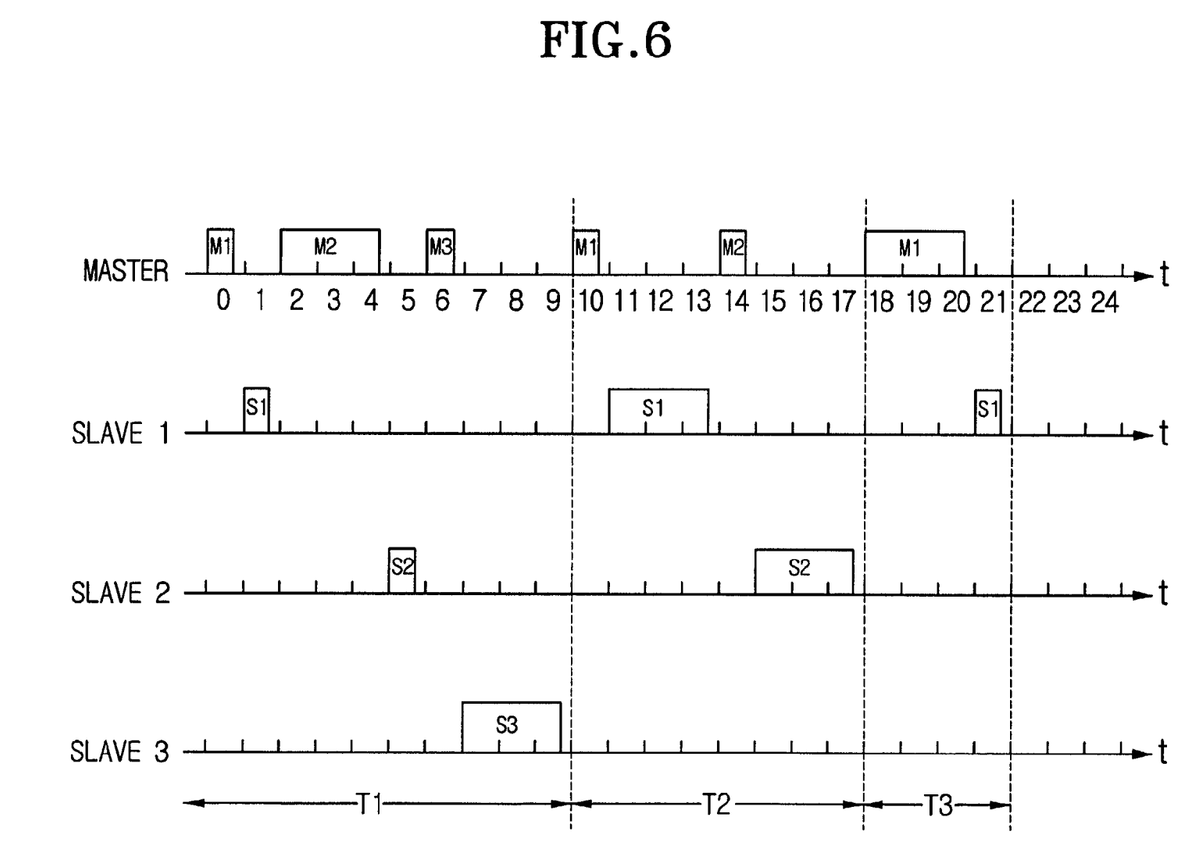
FIG. 6 shows timings of a process in which a master device polls according to the priority allocated to slave devices.

FIG. 6 shows timings of a process in which a master device polls slave devices according to the priority assigned to the slave devices.

The master device sequentially transmits data at a predetermined slot interval according to the priority of each of the slave devices in active mode.

In FIG. 6, the character M refers to a slot section where the master device polls the slave devices. Numbers are attached to the character M to indicate the slave devices being polled. Likewise, the character S refers to a slot section where the slave devices transmit data to the master device, and numbers are attached to the character S to indicate the slave devices that transmit the data.

Figure 7:
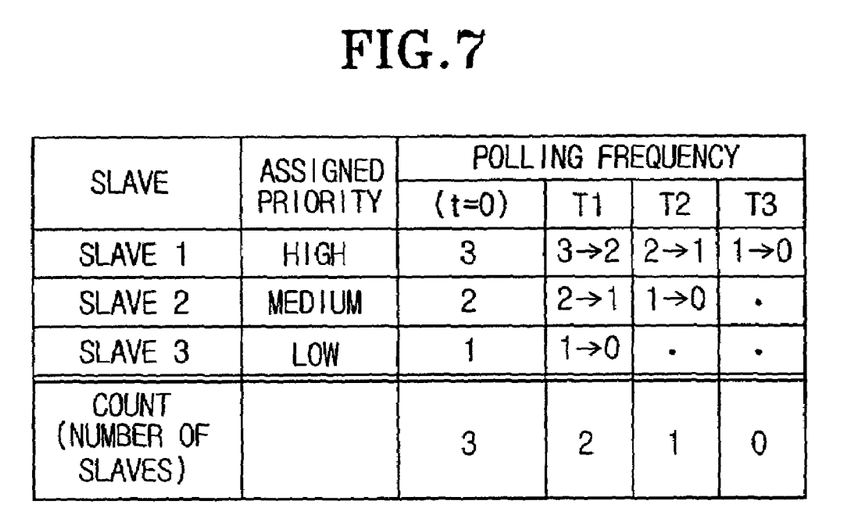
FIG. 7 shows an example of slave information stored in a memory.

FIG. 7 is an example of information about the slave devices that is stored in the memory 32.

Referring to FIG. 7, the priorities of slave devices 1, 2 and 3 are high, medium and low, respectively, and the polling frequency assigned according to the priority is 3, 2 and 1 times, respectively. The total number of the slave devices to be polled is three (3).

The master device sequentially polls the respective slave devices 1, 2 and 3 in the first polling section T1.

One (1) time is subtracted from the respective polling frequencies of the slave devices 1, 2 and 3 that are stored in the memory 32, and accordingly, the polling frequencies of the slave devices 1, 2, and 3 become two (2) times, one (1) time, and zero (0) time, respectively.

Here, since the polling frequency of the slave device 1 becomes zero (0), the number of the slave devices to be polled is reduced by one (1) and accordingly becomes two (2).

Then the master device sequentially polls each of the slave devices 1 and 2 excluding the slave device 3 that has the zero (0) polling frequency in the second polling section T2.

Accordingly, one time is again subtracted from the respective polling frequencies of the slave devices 1 and 2, and the polling frequencies of the slave devices 1 and 2 become one (1) time and zero (0) time, respectively.

Since the polling frequency of the slave device 2 becomes zero (0), one is subtracted from the total number of the slave devices to be polled, and the total number of the slave devices to be polled becomes one (1).

In the third polling section T3, the master device polls the slave device 1 excluding the slave devices 2 and 3 which have the zero (0) polling frequency.

Accordingly, one (1) time is subtracted from the polling frequency of the slave device 1, and the polling frequency of the slave device 1 becomes zero (0). Accordingly, the total number of the slave devices to be polled is also reduced by one (1) and becomes zero (0).

As described above, the slave devices 1, 2, and 3 are polled until the polling frequencies thereof become zero (0). Here, the slave device 1 of high priority is polled three (3) times, and the slave device 2 of medium priority is polled two (2) times, and the slave device 3 of low priority is polled one (1) time.

That is, the slave device 1 of high priority transmits the largest amount of data while the slave device 3 of low priority transmits the smallest amount of data.

When the polling frequencies of the respective slave devices become zero (0), the master device initializes both the polling frequencies and the total number of slave devices to be polled, that are stored in the memory 32, into the values set before the polling.

That is, the polling frequencies of the slave devices 1, 2 and 3 are initialized to three (3) times, two (2) times and one (1) time, respectively, while the total number of the slave devices to be polled is initialized to three (3).

Figure 8A:
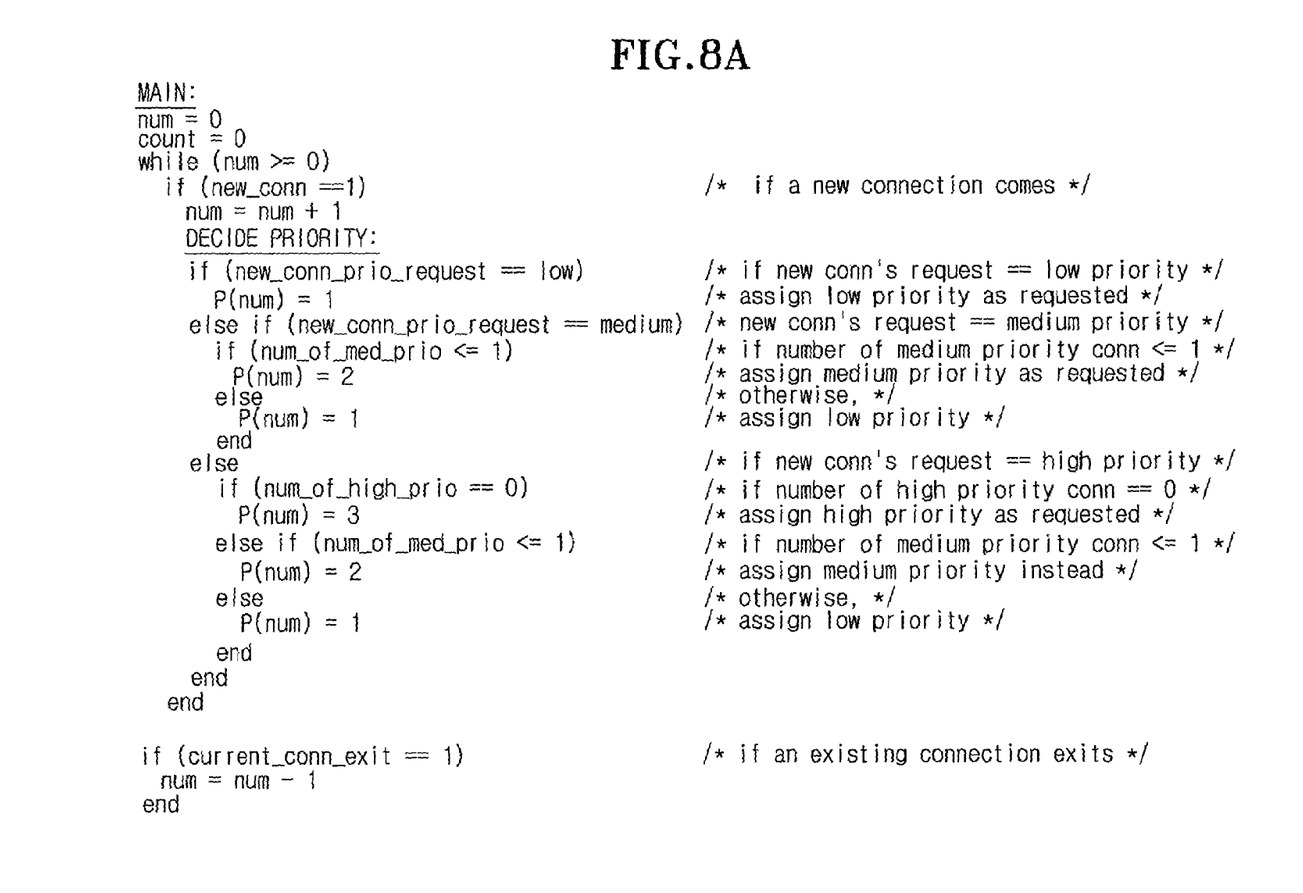
FIGS. 8A and 8B show program source codes of the priority determining process of FIG. 4 and the polling process of FIG. 5.
Figure 8B:
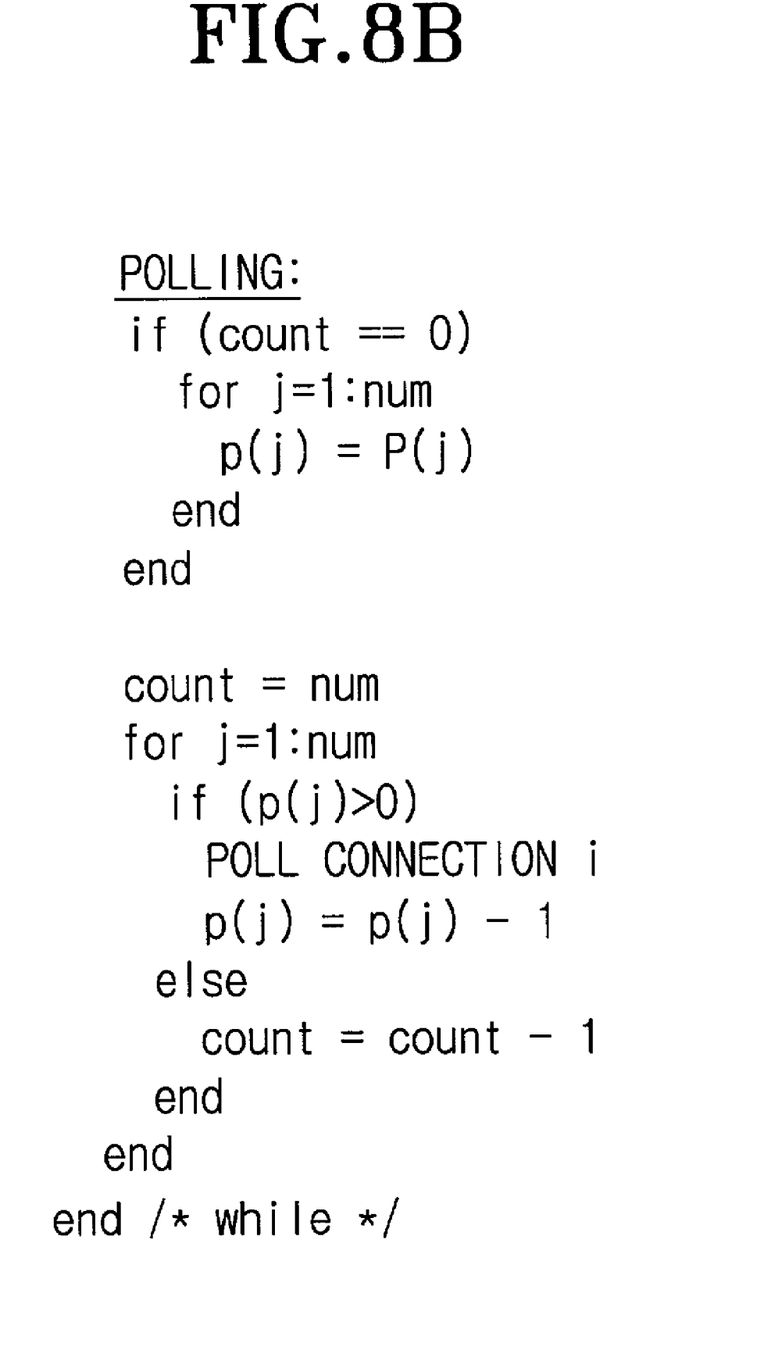

FIGS. 8A and 8B show program source codes of the priority determining process of FIG. 4 and the polling process of FIG. 5.

As described hereinbefore, according to the wireless communication apparatus, the wireless communication system adopting the same and the communication method thereof, a suitable transmission rate is assigned to the slave devices, not uniformly, but according to the need of the slave devices, so that assigning an excessive or insufficient transmission rate can be prevented.

The present invention is not restricted to the foregoing embodiment thereof and changes can be made by those skilled in the art without departing from the scope of the invention. Therefore, the scope of the invention is defined by the following claims rather than the detailed description thereof.

What is claimed is:

1. A wireless communication apparatus for performing a wireless communication, comprising:
   a transceiving unit for receiving and transmitting data externally, the transceiving unit maintaining a link to at least one slave device and receiving a requested priority transmitted from the at least one slave device, when the wireless communication apparatus is operated as a master;
   a controller for determining a priority of the at least one slave device considering the requested priority and priorities of the other slave devices that are currently linked, determining a frequency of communication according to the determined priority of the at least one slave device and controlling the communication with the at least one slave device; and
   a memory for storing the frequency of communication of the at least one slave device,
   wherein the controller communicates with the at least one slave device in accordance with the frequency of communication, and
   wherein the controller adjusts the frequency of communication after each communication between the controller and the at least one slave device.

2. The wireless communication apparatus of claim 1, wherein the frequency of communication increases as the priority increases.

3. The wireless communication apparatus of claim 1, wherein the controller assigns a priority lower than the requested priority when the requested priority is not allowable to the at least one slave device.

4. The wireless communication apparatus of claim 1, wherein the controller adjusts the frequency of communication by subtracting one time from the frequency of communication after each communication between the controller and the at least one slave device.

5. The wireless communication apparatus of claim 1, wherein the controller updates the frequency of communication stored in the memory after communicating with the at least one slave device.

6. The wireless communication apparatus of claim 5, wherein the controller updates a total number of slave devices stored in the memory whenever a slave device becomes linked or unlinked.

7. The wireless communication apparatus of claim 1, wherein levels of the priority include high, medium, and low levels.

8. The wireless communication apparatus of claim 1, wherein the memory stores a high priority maximum number which is a maximum number of slave devices of a high priority, and a medium priority maximum number which is a maximum number of slave devices of a medium priority.

9. The wireless communication apparatus of claim 1, wherein the memory stores priorities of the slave devices that are currently linked.

10. The wireless communication apparatus of claim 1, wherein levels of the priority include high, medium, and low levels.

11. The wireless communication apparatus of claim 1, wherein the memory stores a total number of slave devices that are currently linked.

12. The wireless communication apparatus of claim 11, wherein the memory stores a polling frequency of each slave device that is currently linked.

13. The wireless communication apparatus of claim 12, wherein slave devices that have a polling frequency greater than zero are sequentially polled according to their priorities.

14. The wireless communication apparatus of claim 13, wherein one time is subtracted from the polling frequencies of each slave after the respective slave has been polled.

15. The wireless communication apparatus of claim 14, wherein any slave device having a non-zero polling frequency is repeatedly polled.

16. The wireless communication apparatus of claim 15, wherein one is subtracted from the total number of slave devices stored in the memory when a slave device has a zero polling frequency.

17. The wireless communication apparatus of claim 16, wherein the memory is updated to have an initial value of both the total number of slave devices and the polling frequency of each slave device when the total number of slave devices becomes zero.

18. A wireless communication system having at least one slave device and a master device linked with the at least one slave device, the at least one slave device transmitting a requested priority to the master device, and the master device receiving the requested priority from the at least one slave device, and determining and assigning the at least one slave device with a priority considering the requested priority and priorities of the other slave devices that are currently linked, wherein the at least one slave device transmits the requested priority according to the amount of data to be transmitted to the master device, wherein the master device communicates with the at least one slave device in accordance with a frequency of communication which is determined according to the priority, and wherein the master device adjusts the frequency of communication after each communication between the master device and the at least one slave device.

19. The wireless communication system of claim 18, wherein the at least one slave device transmits the requested priority to the master device upon being linked with the master device.

20. The wireless communication system of claim 18, wherein the priority assigned by the master device is lower than the requested priority if the requested priority is not allowable to the at least one slave device.

21. The wireless communication system of claim 18, wherein the master device adjusts the frequency of communication by subtracting one time from the frequency of communication after each communication between the master device and the at least one slave device.

22. The wireless communication system of claim 18, wherein the frequency of communication increases as the priority increases.

23. A communication method in a wireless communication system having at least one slave device and a master device linked with the at least one slave device, comprising the steps of:

receiving a requested priority transmitted from the at least one slave device;

determining and assigning the at least one slave device with a priority considering the requested priority; and communicating with the at least one slave device according to the determined and assigned priority, wherein the master adjusts the frequency of communication by subtracting one time from the frequency of communication after each communication with the at least one slave device.

24. The communication method of claim 23, wherein, in the determining and assigning the at least one slave device with a priority considering the requested priority, the priority assigned to the at least one slave device is lower than the requested priority, if the requested priority is not allowable to the at least one slave device.

* * * * *